Dec. 18, 1962  W. T. RENTSCHLER ET AL  3,068,768
CAMERA
Filed Dec. 24, 1959 5 Sheets-Sheet 1
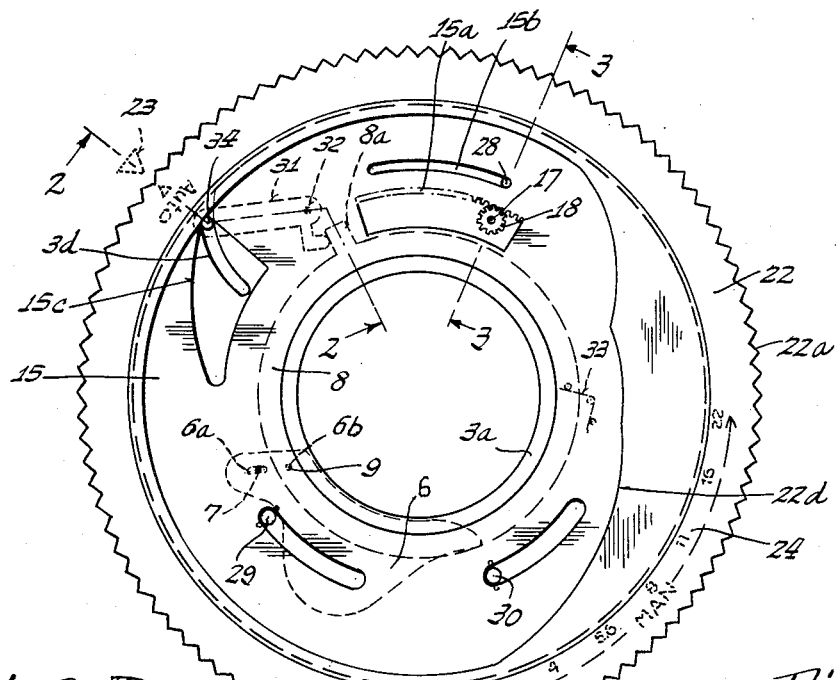
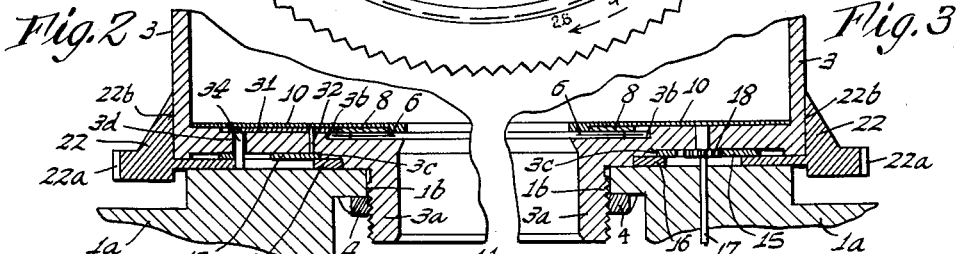
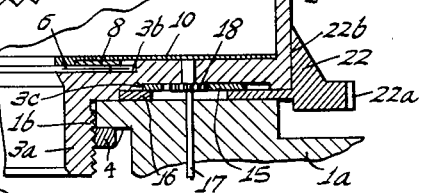
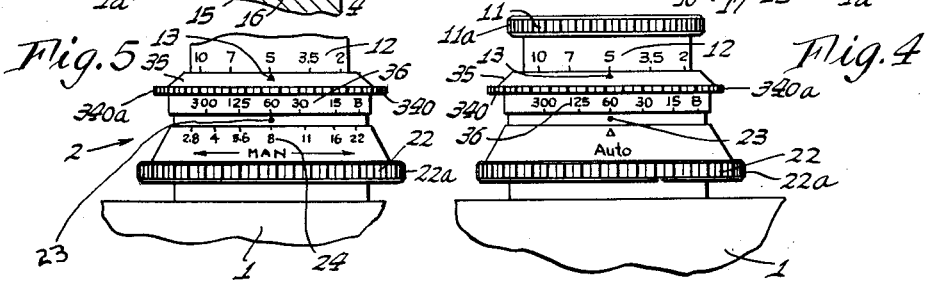
INVENTORS.
Waldemar T. Rentschler
Franz W. R. Starp
BY Munn, Liddy, Daniels & March
ATTORNEYS

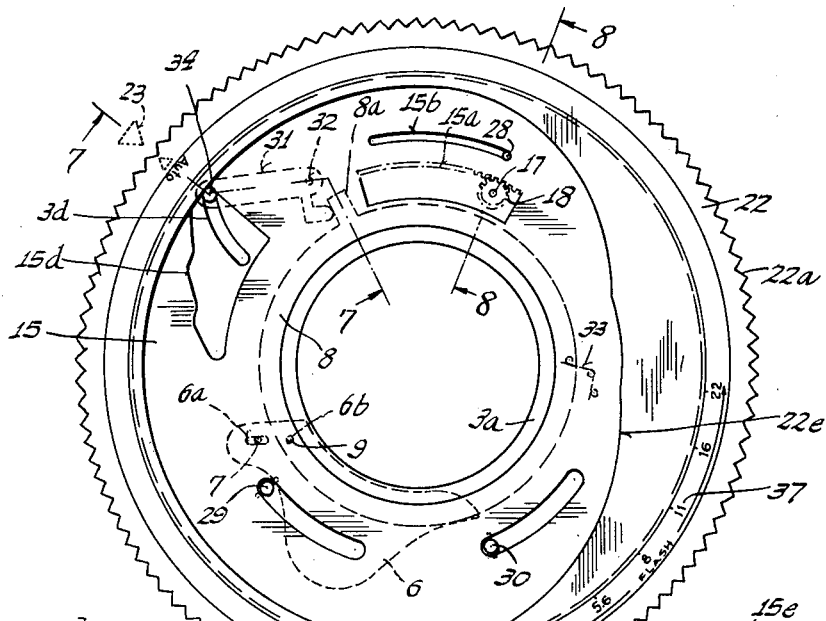
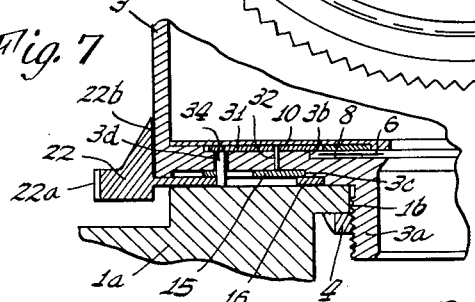
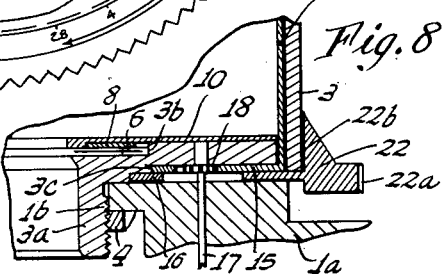
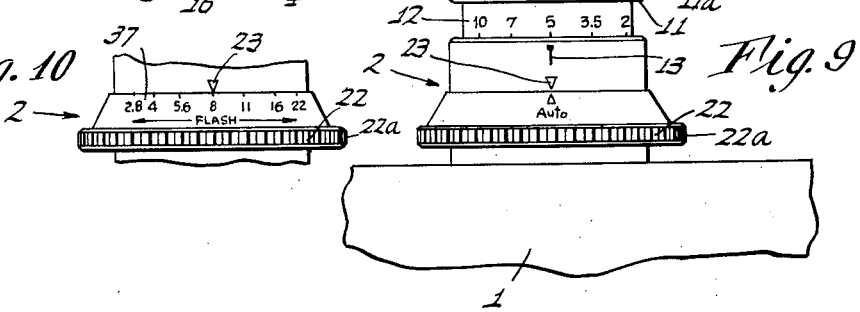

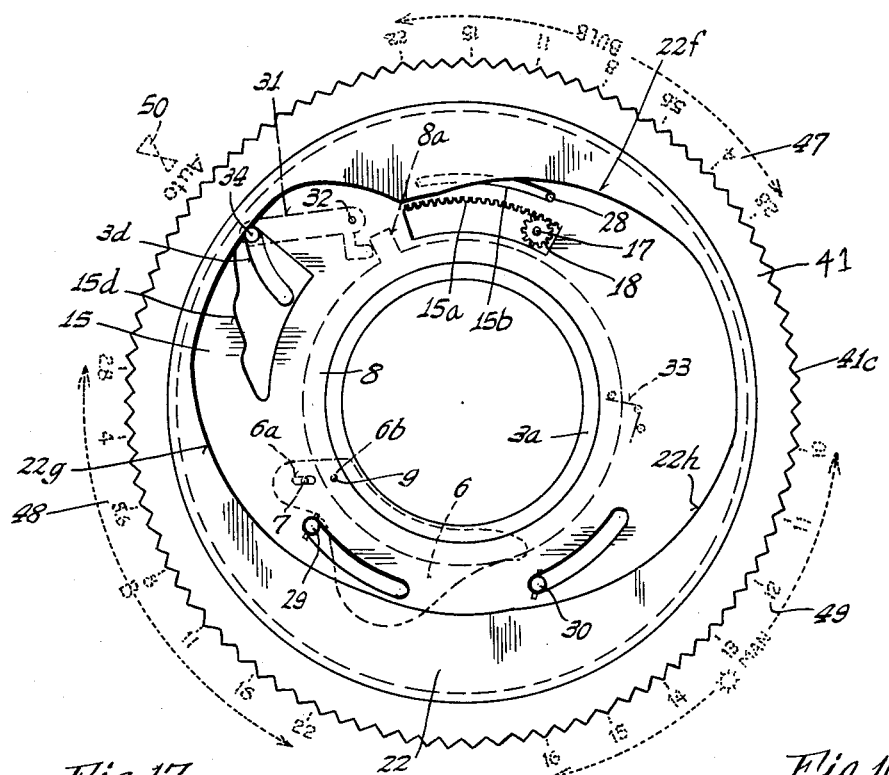
Fig. 11
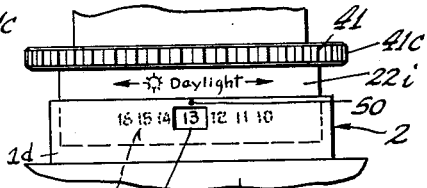
Fig. 17
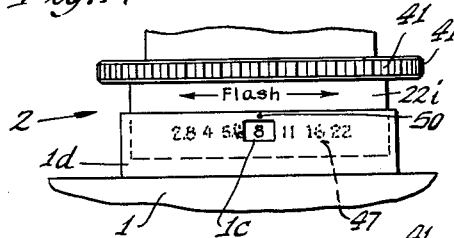
Fig. 15
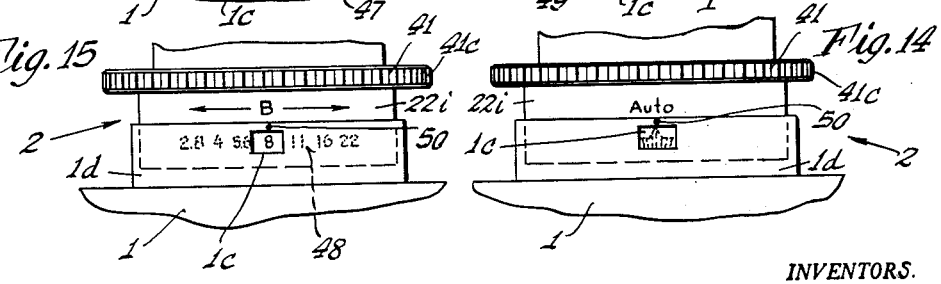
Fig. 16
Fig. 14
INVENTORS.
Waldemar T. Rentschler
Franz W. R. Starp
BY Munn, Liddy, Daniels & March
ATTORNEYS Dec. 18, 1962    W. T. RENTSCHLER ET AL    3,068,768
CAMERA
Filed Dec. 24, 1959    5 Sheets-Sheet 4

INVENTORS.
Waldemar T. Rentschler
Franz W. R. Starp
BY
Munn, Liddy, Daniels & March
ATTORNEYS

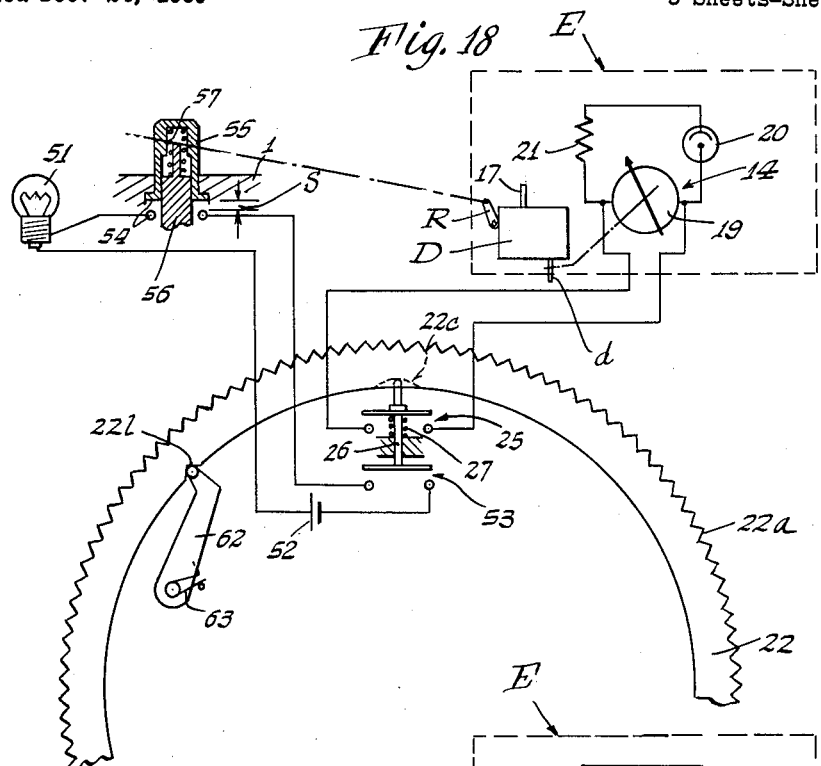
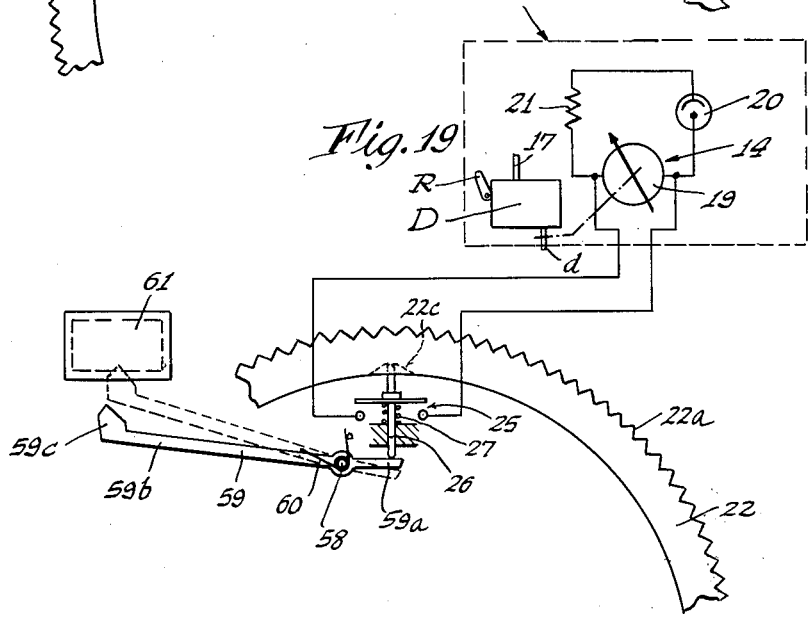

United States Patent Office 3,068,768
Patented Dec. 18, 1962

3,068,768
CAMERA
Waldemar T. Rentschler and Franz Wilhelm Reinhard Starp, Calmbach (Enz), Germany, assignors to Alfred Gauthier, G.m.b.H., Calmbach (Enz), Germany, a corporation of Germany
Filed Dec. 24, 1959, Ser. No. 861,917
Claims priority, application Germany Dec. 31, 1958
14 Claims. (Cl. 95—10)

This invention relates to cameras of the type wherein setting of the diaphragm is automatically effected by an exposure regulator.

An object of the invention is to provide a novel and improved camera of the above type wherein the diaphragm is automatically adjustable, which camera is characterized by an advantageous simplicity of construction involving relatively few, easily fabricated parts so that there is obtained a desirable economy in manufacture.

Another object of the invention is to provide a novel and improved camera with automatic diaphragm adjustment as characterized above, which has optimal operational and functional simplicity, is especially reliable in its operation, and is of flexible arrangement whereby the diaphragm setting may be readily selectively effected either as an automatic operation responsive to functioning of the exposure regulator or else as a manual operation, utilizing a manual adjustment.

The above objects are accomplished, in accordance with the invention, by the provision of two setting members which are tensionally and positively connected with the diaphragm in a manner such that each may effect a setting thereof, one of said members being automatically driven or actuated by a driving device to different adjusted positions determined in each case of contemplated exposure by the exposure regulator, whereas the other or manual setting member is manually operable to effect manual adjustment and can also be selectively placed either at an "automatic" position or else moved in an adjusting range constituting a "non-automatic" position.

The arrangement is such that when the said "manual" setting member is in its "automatic" or non-adjusting position it is associated with one end position of the diaphragm, at least at the start of the exposure; also, when the said setting "manual" member is in its "non-automatic" or adjusting position the automatically movable setting member is, at least at the start of the exposure, in a settting position which is likewise associated with one end position of the diaphragm, there being further effected by the invention for such positions of the setting members (corresponding to the end range of the diaphragm) a disconnection of the control over the diaphragm which is otherwise exercised by the member so placed or positioned. The organization effecting this as seen in the illustrated embodiments of the invention, utilizes one-way driving connections as will be later described.

The above arrangement as provided by the invention has a special advantage in that there is not required any substantial additional expenditure in accomplishing the stated objects nor is there any interference with the structure of the automatic control device in order to obtain the selective action by which the diaphragm may be either automatically adjusted in response to the exposure regulator or else manually regulated or adjusted. These advantages are obtained by virtue of separate setting members being provided to adjust the diaphragm automatically and non-automatically or manually, each of said separate setting members being tensionally and positively connected to the diaphragm, as by a one-way drive.

A special advantage is had, in accordance with the invention, by causing the exposure regulator to be inoperative or inactivated in response to means controlled by the manually operable setting member when the latter is not located in the "automatic" or non-adjusting position. Also, when the manually operable setting member is placed in non-automatic position, that is, any setting position other than "automatic," there is effected a shifting of the automatically movable setting member under power from a driving device into its non-operative setting position which corresponds to the run-off condition of the driving device and which is associated with one end position of the diaphragm.

This produces the desirable result that no special (and especially manually shiftable) operating or actuating devices are required to move or shift the automatically movable setting member into the inoperative setting position (wherein its control influence is discontinued) which it is desired to have it occupy when the diaphragm is to be manually adjusted. In addition to the saving resulting from not providing special operating or actuating mechanisms to shift the automatically movable setting member, there is the further advantage from the above arrangement that a free or unrestricted selection or option between "automatic" to "non-automatic" settings and vice versa is had, for both the "set" and "unset" condition of the driving device which actuates the automatically operated setting member. This is due to the fact that the driving device which actuates the automatically movable setting member runs down, both in the "automatic" position of the manually operable setting member and in the "non-automatic" position thereof.

Due to the fact that the camera of the present invention involves two separate setting members which are operable in different manners and which effect respectively the automatic and non-automatic setting of the diaphragm, it is feasible, practical and advantageous to employ different extents of movement per diaphragm value for each of the two setting members. With such arrangement the automatically adjusted setting member is preferably arranged to have a shorter or lesser path of travel, thereby effecting a shorter or quicker setting time of the diaphragm, and the manually operable setting member is preferably associated with a longer or greater path of movement, which advantageously provides a more easily read scale and adjustment of the diaphragm.

The cooperation or one-way driving connection between the diaphragm mechanism and the two setting members may be effected in a simple and economical manner, providing for good adaptability of the device to various camera and diaphragm structures, by the provision of cams on the setting members and by the provision of an actuating member connected to the diaphragm mechanism (as for example an actuating lever or the like) which tensionally and positively cooperates with the said cams.

An easily comprehended operation of the above diaphragm adjustment structure, which tends to prevent misunderstanding and irritation on the part of the operator, is had by providing visible markings which indicate the "automatic" and "non-automatic" setting positions of the manually operable setting member, and by so organizing the cams and associated structures that the marking which is not applicable to the existing position or setting of the manually operable member is not in the visual field of the operator.

Further, in accordance with the invention, the automatically movable setting member may be connected not only with the control device for the diaphragm, but also to a setting device controlling the shutter speed or exposure time, which device will provide shutter speeds especially suited for manually taken photographs, in which case the path or extent of adjustment of the setting member defines a predetermined range with definite limits, which is characterized by a monotonous exposure value gradation.

Cameras constituted in this manner can be made very simple in operation, and their operation will be carried out virtually without error. This is particularly due to the fact that the operator need have no knowledge of the value of time-diaphragm pairs which must be effected for obtaining proper pictures, since the positive correlation of the shutter speeds and diaphragm values together with the automatic setting of these by the exposure regulator always insures the taking of satisfactory photographs, at least just as long as the adjusted shutter speed of the camera is suited for the taking of photographs with the camera handheld. The manually operable setting member enables a camera as above outlined to have a useful range which is practically the equivalent of that of well known cameras having separate speed and diaphragm adjustments, while at the same time retaining great simplicity in reliable arrangement providing free or unrestricted selection of either manual or automatic diaphragm adjustment.

A camera of the above type in accordance with the invention will produce photographs utilizing shutter speeds which are not automatically controlled, and utilizing selectively all the available diaphragm apertures, since when the manually operable setting member is not at the "automatic" position a well-known "B" exposure device for maintaining the camera shutter open may be actuated and made operative, and since a further control device may be associated with the manually operable setting member to make available the entire diaphragm range for "B" exposures.

In addition, in accordance with the invention, the camera may still be utilized for taking pictures even when the exposure regulator is out of order or not functioning. This is accomplished by effecting a connection, when the manually operable setting member is not in "automatic" position, to a control device which adjusts the shutter to provide an exposure time insuring satisfactory photographs not spoiled by moving the camera and which time also may be utilized for taking photographs of objects moving at medium speed, and by associating with the manually settable member a further control device by means of which the entire diaphragm adjusting range can be associated with this particular shutter speed or exposure time.

A clearly visible and easily understandable setting of the manually operable setting member, which will avoid misunderstanding and irritation on the part of the operator may be effected by arranging on said member suitable scales which can be read through a viewing window which is provided on a stationary cover member and has a suitable index mark, and by providing other non-covered markings, as for example words or symbols, on the manually operable setting member for the purpose of characterizing the kinds of exposure to be associated with the respective setting scales.

Also, in order to obtain a maximum clarity of operation, the invention provides an optional warning device which is operable in response to the movement of the manually operable setting member and which functions when the setting member is not disposed in the "automatic" position.

Such a warning device may be constituted in various advantageous ways. One desirable construction, both with respect to effectiveness, free mobility and adaptability to the structure of the camera involves constituting the warning device as an indicating electric lamp which may be automatically energized only when the camera is in operative condition, that is, ready for the taking of a photograph.

The indicating lamp may be advantageously arranged so that it is energized by arranging an electric switch in the circuit of the lamp and under the control of the fingerpiece of the camera release mechanism. For this purpose, the fingerpiece may be made shiftable, with respect to its carrier member, a slight preliminary extent to effect the closing of the circuit.

In another advantageous arrangement involving few parts and low cost, the warning device may be in the form of a mechanical signal, as for example a movable part or flag which appears in the view finder of the camera.

The reliability of operation and simplicity of a camera constructed in accordance with the invention may be further increased by the provision of a well known detent device or mechanism for releasably holding the manually operable setting member in its "automatic" setting.

Several embodiments of the invention are illustrated in the accompanying drawings, in which:

FIGURE 1 is a rear elevational view of a photographic intra-lens shutter assembly incorporating a diaphragm setting device as provided by the invention. The said setting device is illustrated in its automatic or "auto" position.

FIG. 2 is a fragmentary axial sectional view, taken on the line 2—2 of FIG. 1.

FIG. 3 is a fragmentary axial sectional view taken on the line 3—3 of FIG. 1.

FIG. 4 is a top plan view of the intra-lens shutter assembly of FIG. 1, shown set for "automatic" adjustment of the diaphragm.

FIG. 5 is a view like FIG. 4, but showing the shutter set for manual or non-automatic adjustment of the diaphragm.

FIG. 6 is a rear elevational view of an intra-lens shutter assembly similar to that shown in FIG. 1 and illustrating further a connection between the diaphragm setting device and a control governing the shutter speed. The setting device is shown in the automatic position.

FIG. 7 is a fragmentary axial sectional view, taken on the line 7—7 of FIG. 6.

FIG. 8 is a fragmentary axial sectional view taken on the line 8—8 of FIG. 6.

FIG. 9 is a top plan view of the intra-lens shutter assemblage shown in FIG. 6, with the setting being on "automatic."

FIG. 10 is a fragmentary top plan view along the lines of FIG. 9 but showing the shutter in the "non-automatic" setting position, namely in the "flash" position.

FIG. 11 is a rear elevational view of a photographic intra-lens shutter assembly incorporating a diaphragm and speed setting device as provided by the invention. This shutter assembly is so constituted as to have a greater useful range than the embodiment of FIGS. 6–10.

FIG. 14 is a fragmentary top plan view of the intra-lens shutter assembly of FIGS. 11–13, shown in the "automatic setting" setting.

FIG. 15 is a view like FIG. 14, but showing the shutter assembly adjusted for a "B" exposure setting.

FIG. 16 is a view like FIGS. 14 and 15 but showing the shutter assembly placed in the "daylight" setting.

FIG. 17 is a view like FIGS. 14-16 but showing the shutter assembly in the "flash" setting.

FIG. 18 is a diagrammatic representation illustrating various warning, safety and actuating devices which are operable in response to and are under the control of the manually operable diaphragm setting member or the shutter release device.

FIG. 19 is a diagrammatic representation of another type of warning device as provided by the invention.

Figure 13:
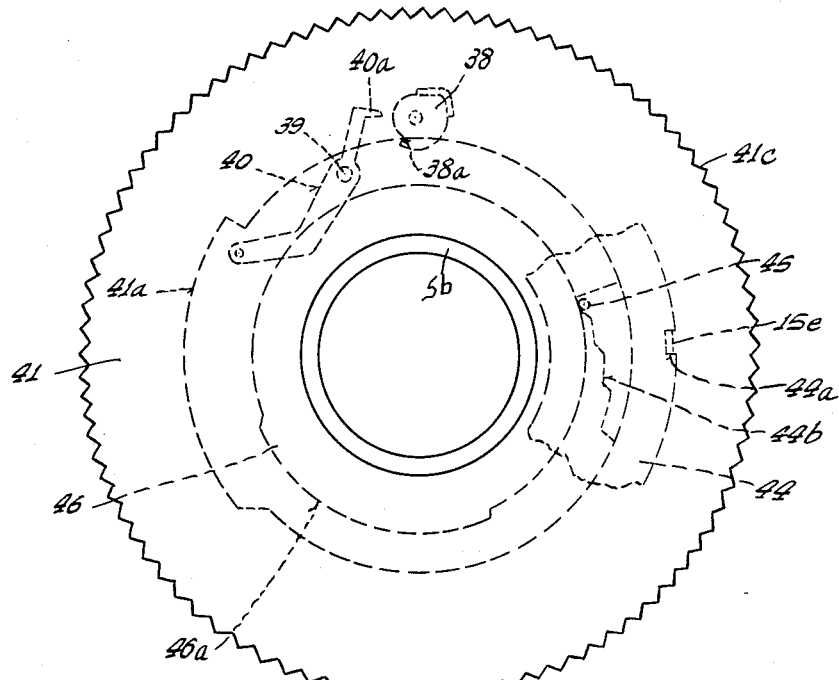
FIG. 13 is a diagrammatic representation of the shutter speed or exposure time setting device as employed in the embodiment of FIGS. 11 and 12.

In the drawings, various parts or components which are generally similar in construction and function have been given similar reference characters in the different embodiments of the invention, for convenience of comparison. However, minor variations may exist between these similarly numbered parts in the different illustrated embodiments, and it will be understood that only in any one embodiment of the invention the similarly numbered parts be identical.

Referring now to FIGS. 4, 5, 9 and 14-18, the numeral 1 indicates the housing or case of a photographic camera. On the front wall 1a of the camera case 1 there is a circular opening 1b, into which may be inserted in a well-known manner the mounting tube 3a provided on the rear of the housing 3 of an intra-lens shutter assembly 2, the tube 3a having the usual external screw threads. The shutter assembly 2 may be secured to the camera case 1 by means of a usual threaded clamping ring 4 as seen in FIGS. 2 and 3.

The shutter housing 3 has the usual base plate 5 (FIG. 12) which serves for mounting the well-known members of the shutter mechanism (not shown for reasons of clarity of illustration). At the rear of the base plate 5 there is provided clearance space 5a for the shutter blades, while a clearance space 3b for the diaphragm segments 6 is provided at the interior of the rear wall of the shutter housing 3. Each of the diaphragm segments 6 has a slot 6a to accommodate a pin 7, a number of which are mounted on the shutter housing. Each of the diaphragm segments 6 has a hole 6b to accommodate a pin 9, a number of which are mounted on a reciprocable diaphragm ring 8.

At the front of the shutter assembly 2 there is provided a range or distance setting ring 11 having knurling 11a, the said ring being adjustable with respect to a stationary index mark 13 and having a distance or meter scale 12 cooperable with the said mark.

For the purpose of setting or adjusting the diaphragm, the invention provides two separate setting members which are tensionally and positively connected to the diaphragm, as by one-way positive driving connections, one of said setting members being automatically movable into positions determined by the exposure regulator through the medium of a powered driving device whereas the other setting member is manually operable and adjustable between an "automatic" position and a "non-automatic" or adjusting range.

In accordance with the invention the manually operable setting member when in "automatic" position occupies at the start of an exposure (at the very latest) a setting position which is associated with one end position of the diaphragm and wherein the control influence of this setting member is discontinued or disconnected; also, when the manual setting member is in its "non-automatic" or adjusting range the automatically movable setting member is disconnected or its control of the diaphragm discontinued, and said automatic setting member is shifted to a position associated with one end position of the diaphragm.

In the illustrated embodiment of the invention the diaphragm setting member which is automatically adjustable in response to the position of the exposure regulator is constituted as a ring 15. The exposure regulator is shown diagrammatically in FIGS. 18 and 19, being indicated by the letter "E" and the measuring device by the numeral 14. The diaphragm setting ring 15 is rotatably mounted on a shoulder 3c provided on the rear wall of the shutter housing 3, and is secured against axial movement by a ring 16 affixed to the said rear wall. The connection between the diaphragm setting ring 15 and the exposure regulator is established by a transmission shaft 17 rotatably mounted on the shutter case wall 1a, the said shaft having a pinion 18 meshing with gearing 15a provided on the setting ring 15.

Devices for automatically setting the diaphragm by use of power and under the control of a measuring device are known by themselves, and the invention does not relate to the details of such devices. One type of such automatic diaphragm setting device may, for example comprise a slide, roller or disc having a stepped edge, said part being shifted together with the shaft 17 or transmission means until the stepped edge abuts a feeler or stop lug carried by the movable portion or measuring device of the exposure regulator. Control devices of this type are illustrated and described in copending application Serial No. 748,724, filed July 15, 1958 and entitled Photographic Camera With Electric Exposure Regulator and Patent No. 2,993,422 issued July 25, 1961, and entitled Photographic Camera With Automatic Exposure Setting. In FIGS. 18 and 19 the movable member 19 of the exposure regulator comprises the turnable coil of a well known measuring device such as a moving coil galvanometer or instrument movement, which coil is fed by current from a photo-electric cell 20. A resistance 21 may be arranged in the circuit of the galvanometer for the purpose of adjusting the same.

The manually operable setting member for the diaphragm is constituted as a ring 22 provided with knurling 22a. In the embodiments of the invention illustrated in FIGS. 1-5 and 6-10, the ring 22 is disposed on the rear of the shutter assembly between the rear wall of the shutter housing 3 and the front wall 1a of the camera. The manually operable setting ring 22 has a bearing on the outer periphery or surface of the side wall of the shutter housing 3, said ring having an internal cylindrical bearing surface 22b for this purpose.

As already stated above, the manually operable setting ring 22 can be placed in an "automatic" position and "non-automatic" or manual adjusting range. These positions are respectively indicated, in the embodiments of the invention shown in FIGS. 1-5, by the words "Auto" and "Man" arranged on the ring 22 and referable to a stationary setting or index mark 23. When the manually settable ring 22 is in the "Auto" position, the diaphragm is arranged to be automatically adjusted by means of the setting ring 15 which is connected to the exposure regulator E, whereas if the diaphragm is to be manually adjusted this is accomplished by means of the ring 22, disposed in the "Man" range. For this purpose, the manually operable ring 22 has a diaphragm scale 24 which is associated with the word "Man" and is cooperable with the above mentioned index mark 23. In order to provide for a completely independent adjusting operation of the diaphragm by each of the two setting rings 15, 22 the rings are connected to the diaphragm ring 8 in such a manner that when the manually operable setting ring 22 is in the "automatic" position or when the automatically movable setting ring 15 is not to be used because the manual setting ring is in the manual position, the control influence of the rings is discontinued or disconnected.

A box "D" is illustrated in FIGS. 18 and 19, representing a driving device of the type disclosed in the referred-to copending applications. The shaft 17 is shown connected to the device "D," also a shaft "d" coupled to the coil 19 for adjustment thereby and having the stop lug or feeler referred to above. A release lever "R," shown coupled to the shutter release 55 for actuation thereby, effects release of the cocked or tensioned slide or roller referred to above as part of the driving device. The box "E" shown in broken outline represents the complete exposure regulator of the camera, which includes the photocell 20, etc.

It will be understood that low levels of energization of the exposure regulator 14, caused by poor light, result in the large diaphragm aperture being adjusted.

A short circuiting switch 25 (FIGS. 18 and 19) is disposed in the circuit of the exposure regulator E for the purpose of disconnecting or rendering the same inoperative. The movable member of the switch 25 is connected to a pin 26 arranged to engage the inner periphery of the setting ring 22 under the action of a spring 27. When the ring 22 is in the "automatic" setting position as shown in FIGS. 18 and 19, the pin 26 occupies a recess 22c provided on the ring. This has the effect of opening the switch 25 and rendering the exposure regulator E operative. In all other setting positions of the ring 22 the switch 25 is maintained closed and the exposure regulator is thereby made inoperative. This latter condition causes the ring 15 to be shifted, under the action of its driving device which responds to low levels of energization of the regulator by increasing the aperture, into an inoperative setting position which corresponds to the run-down state of the driving device and with which one end position of the diaphragm is associated. This end position, in the illustrated embodiments of the invention, corresponds to the largest diaphragm aperture. The path of movement of the setting ring 15 is limited by a pin 28 fixed on the shutter housing (FIGS. 1, 6 and 11). To provide clearance for the pin 28 corresponding to the total adjusting range of the diaphragm, a slot 15b is provided in the ring 15, the length of the slot being commensurate with the said adjusting range.

The tensioning or cocking of the driving device which actuates the ring 15, and by which tensioning the ring is shifted into the setting position associated with the other (smallest diaphragm aperture) end position of the diaphragm and is locked therein, is preferably effected simultaneously with the setting or cocking of the shutter. For this purpose, the shutter has a tensioning shaft 29 which projects from the rear wall of the shutter housing 3 and is connected in a known manner to an operating device arranged inside of the camera, as for example the film transporting device. Similarly, the automatically controlled setting ring 15 when retained in tensioned or cocked position is preferably released in response to actuation of the shutter release mechanism illustrated in FIGS. 1, 6 and 11. Such release mechanism is shown as including a release shaft 30 projecting through the rear wall of the shutter housing 3 and connected to the operating device arranged on the inside of the camera. The setting of the diaphragm and the opening of the shutter after the latter has been released are mutually adjusted or related in such a manner that the ring 15 is enabled to attain its proper setting position as determined by the exposure regulator before the shutter blades start to open. The delay in running off of the shutter required for this purpose may be brought about, for example, by means of a well-known escapement mechanism.

A positive, tensional or one-way driving connection of the setting rings 15 and 22 to the diaphragm mechanism is provided, in the illustrated embodiments of the invention, by means of an angle-shaped lever or bell crank 31 which is pivotally mounted about an axle 32 on the rear wall of the shutter housing. The diaphragm ring 8 has a projection 8a arranged to engage one arm of the lever 31 under the action of a biasing spring 33, whereas the other arm of the lever 31 carries a pin 34 which passes through a slot 3d in the rear wall of the shutter housing 3 and engages cams provided on the rings 15 and 22. In the embodiment of the invention as shown in FIGS. 1–5, the cam 15c is associated with the automatically movable setting ring 15, whereas the cam 22d is associated with the manually operable setting ring 22. As is apparent from FIG. 1, the cams 15c and 22d have different angles, the cam 15c having a relatively large angle whereas the cam 22d has a smaller one. This results in the advantage that the ring 15 will have a short adjusting path, resulting in short or quick adjusting time, whereas the adjusting path of the manually operable setting ring 22 will be longer, thereby permitting an expanded arrangement of the diaphragm scale which is associated with the setting range, resulting in easier reading of the said scale.

With the above organization, manual adjustment of the setting ring 22 will result in the cam edge 22d engaging the follower pin 34 carried on the lever arm 31. This will effect a counter-clockwise turning movement of the lever 31, as seen in FIG. 1, whereby the short arm of said lever which engages the lug 8a of the ring 8 will shift the latter in a clockwise direction. It will be noted that this is a positive driving connection, even though it is possible for the pin 34 to be separated from the cam edge 22d, and possible for the short arm of the lever 31 to be separated from the lug 8a. Such separation does not normally occur, by virtue of the fact that the biasing spring 33 continually urges the ring 8 in a conterclockwise direction, taking up any slack and maintaining the engagement mentioned above.

As can be further seen from FIGS. 1, 4 and 5 the two cams 15c and 22d are so arranged on the setting rings 15 and 22 that the marking which is not applicable to the particular function of the manually operable setting ring 22, i.e., either the word "Man" and the associated diaphragm scale 24 or else the word "Auto," are disposed close to the ring 22 and so as to be beyond the visual field of the operator (on the opposite side of the ring). This provides a particularly clear and simple operational arrangement.

The setting of the exposure time or shutter speed, in the shutter structure illustrated in FIGS. 1–5, is effected in a known manner, by means of an exposure time or speed setting ring 340 having knurling 340a. The ring 340 is positioned about a short tubular connection of the shutter assembly, on the front side of the shutter housing and is held against axial movement by a front plate 35. To indicate the desired speed setting, the ring 340 has a speed scale 36, which cooperates with the previously mentioned setting or index mark 23 serving to indicate the different positions of the manually operable setting ring 22. The exposure time that has been set takes into consideration other exposure factors, as by a mechanical, optical or electrical device in a well known manner, as for example by changing a resistance arranged in the circuit of the exposure regulator or by pivoting or turning the measuring mechanism of the exposure regulator during the automatic setting of the diaphragm.

In the shutters of FIGS. 6–10 and 11–17 the exposure time setting is effected in another way, by means of the automatically movable setting ring 15 which adjusts the diaphragm, this being accomplished by providing a connection between the setting ring 15 and a speed setting device providing speed suited for taking photographs with the camera hand held, in addition to the connection from the setting ring to the diaphragm adjusting mechanism, and arranging the automatically movable setting ring so that the adjusting path thereof defines a specified or definite setting range characterized by a monotonous exposure value gradation.

The correlation of speed and diaphragm values for producing such setting range of the ring 15 which is characterized by a monotonous exposure value gradation may, for example, be effected in a manner such that the exposure times $\frac{1}{30}$ sec. and $\frac{1}{60}$ sec. are correlated with the diaphragm value 2.8, the exposure time $\frac{1}{60}$ sec. is correlated with the diaphragm values 4 and 5.6, the exposure time $\frac{1}{125}$ sec. with the diaphragm values 8 and 11, and the time $\frac{1}{250}$ sec. with the values 11, 16 and 22. This correlation of shutter speed and diaphragm values produces a monotonously graduated exposure value series comprising the values 8 to 17.

In order to provide for setting the speed-diaphragm value pairs, the cam 15d associated with the setting ring 15 and influencing the diaphragm ring 8 is given a stepped shape or development as shown in FIGS. 6 and 11. The connection between the setting ring 15 and the exposure time setting device which is shortly to be described below is effected by means of an arm 15e extending angularly from the ring 15 and along the inner periphery of the side wall of the shutter housing.

In the shutter illustrated in FIGS. 6–10 the manually operable setting ring 22 has a single cam 22e arranged to cooperate with the lever 31 by which it actuates the diaphragm ring 8.

Thus, in shutters in which the setting of different exposure times is brought about by means of an automatic adjustment of the diaphragm setting ring, the above method offers the possibility of utilizing the entire diaphragm adjusting range with a specific exposure time or shutter speed which is associated with one end position of the automatically movable setting ring. This permits the use of such a shutter for flashlight photographs, for example, where the distance selected and the type of flash bulb are decisive in setting the diaphragm.

To provide an indication for setting of the manually operable setting ring 22 where flashlight photographs are to be taken, a diaphragm scale 37 is set forth on the ring, cooperating with the index mark 23, and the word "flash" (blitz) is associated with the scale 37 to identify the type of photograph which is to be taken. In addition, the setting ring 22 carries, as in the case of the shutter construction shown in FIGS. 1–5, the word "Auto" to identify its setting position which is associated with the automatic diaphragm setting by means of the ring 15.

FIGS. 11–17 illustrate another embodiment of the invention, comprising a shutter having coupled automatic diaphragm-speed settings, the useful range of which is increased, as compared with the above described shutter. The manually operable setting ring 22 in the embodiment of the FIGS. 11–17 has three identical cams 22f, 22g, and 22h which cooperate with the lever 31 actuating the diaphragm ring 8. Of these cams, the cam 22f serves to adjust the diaphragm for flash light photographs in the manner previously described. The cam 22g, on the other hand, enables the entire diaphragm range to be had, for the taking of "B" exposures.

For this purpose, a well known "B" mechanism for maintaining the camera shutter open after it has been released is made operative by means of the manually operable setting ring 22, this occurring before the cam 22g starts to cooperate with the lever 31. Such "B" exposure device is diagrammatically illustrated in FIG. 13.

In this figure the numeral 38 designates the driving member of the shutter, said member being fixedly carried by the tensioning or cocking shaft 29. To enable "B" exposures to be carried out, the driving member 38 after having been released, is retained in a position associated with the open condition of the shutter blades. In effecting this a two-armed locking lever 40 is provided, pivotally positioned about an axle 39 on the base plate 5 of the shutter, for retaining the said member. The locking lever is tensionally connected to a member (not shown) of the shutter release mechanism and can be moved to "B" position in response to actuation of the shutter release member to a position wherein a projection 40a of the lever 40 is disposed in the path of movement of a projection 38a of the driving member 38. Upon the driving member 38 attaining the position corresponding to the open condition of the shutter blades, the projection 38a impinges on the projection 40a, halting the driving member.

For the purpose of controlling the lever 40 a cam 41a is provided on the ring 41, said cam releasing the lever 40 to enable the latter to become operative before the control cam 22g engages and actuates the lever 31.

The cam 41a is carried by a ring 41 which is rotatably positioned about a short tubular connection 5b of the base plate 5, at the front side of the shutter housing 3, the ring 41 being tensionally connected to the ring 22. To constitute a connecting means, the ring 22 has an extension 22i having the shape of a cylindrical jacket or surface which overlaps the outer circumference of the sidewall of the shutter housing, and a projection 22j provided on the extension 22i extends into a recess 41b provided in the ring 41.

The ring 41 serves to adjust the ring 22, and for this purpose there is provided on the ring 41a knurling 41c. The ring 41 is secured against axial movement in a well known manner, by means of a front plate 42 which is secured in position by a ring 43 screwed onto an external thread provided on the short tubular connection 5b of the base plate 5.

Further, in accordance with the invention, when the manually operable setting ring is not in the "automatic" position a control device may be made operative by said setting ring to insure that manually taken photographs will not be spoiled by movement of the camera, by adjusting the shutter to provide an exposure time which is suitable for taking photographs moving at medium speed. With such organization it is possible to associate the entire diaphragm adjusting range with this particular shutter speed, by means of the above mentioned cam 22h which is provided on the setting ring 22. Such organization makes it possible to use the camera for daylight photographs even when the exposure regulator is not functioning, or else is not provided.

Figure 12:
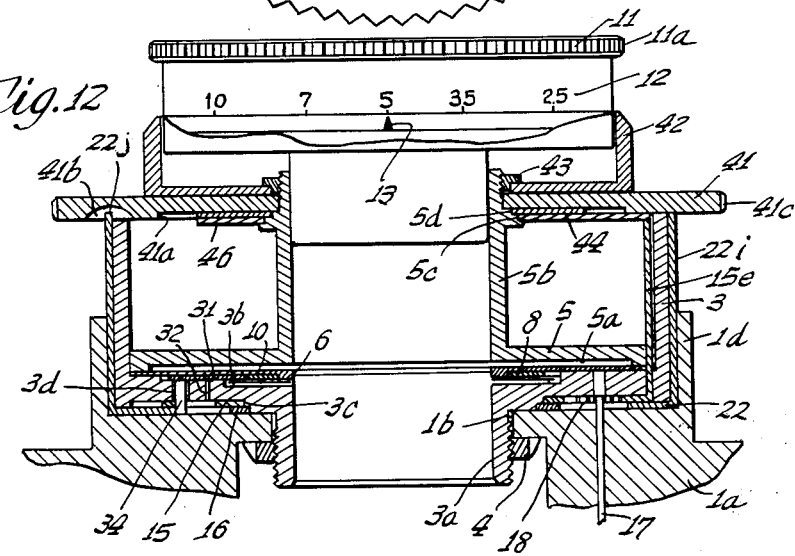
FIG. 12 is an axial sectional view through the intra-lens shutter assembly of FIG. 11, showing the structure and arrangement of the diaphragm setting device and the exposure time setting device connected with the same.

In the embodiment of the invention shown in FIGS. 12 and 13, the above mentioned speed setting device which is connected to the automatically movable setting ring 15 comprises a cam ring 44 which is rotatably carried on a bearing attachment 5c of the base plate 5, at the front side of the shutter housing.

The connection between the cam ring 44 and the automatically movable setting ring 15 is effected by means of the above mentioned arm 15e which extends angularly from the ring 15 and tensionally engages the edge of a recess 44a provided on the ring 44. The cam 44b of the ring 44 cooperates with a well known exposure time or shutter speed escapement mechanism, of which only a pin 45 is shown in the drawing for the sake of clarity, engaging the cam 44b. The cam 44b enables exposure times to be obtained between 1/30 sec. and 1/250 sec. in accordance with the above data relating to the mutually correlated time-diaphragm values.

For the purpose of setting the shutter to provide a speed for use in conjunction with the cam 22a of the manually operable setting ring 22 whereby manually taken photographs will not be spoiled by movement of the camera, and whereby photographs of objects moving at medium speed may also be satisfactorily photographed, a cam ring 46 is provided, connected to the setting ring 22. The cam ring 46 turns on the short tubular bearing 5b of the base plate 5, and is cooperably connected to the ring 41. The radial height of the cam 46a on the ring 46 corresponds to the second offset (from the outside) of the cam 44b of the ring 44, and the cam 46a thus produces an exposure time of 1/125 sec.

To enable a specific diaphragm aperture to be read by adjustment of the manually operable setting ring 22, the setting scales 47, 48 and 49 associated with the cams 22f, 22g and 22h are arranged on the cylindrical jacket 22i. The scales 47 and 48 which serve in setting the diaphragm for flashlight exposures or "B" exposures are diaphragm scales, whereas the scale 49 is constituted of exposure values from 10 to 16, resulting from use of an exposure time of 1/125 sec. and the diaphragm values 2.8 to 22. The said scales can be read in a viewing window 1c which is provided on an annular extension 1d of the camera case 1 overlapping the cylindrical jacket 22i of the setting ring 22. To permit accurate setting of the scale values, the viewing window has a setsing mark or index mark 50. In addition, the types of photographs or exposures associated with the setting scales 47 to 49 are identified by visible markings arranged on the cylindrical extension 42i of the manually operable setting ring 22. In the illustrated embodiment, these markings are words or letters. Those used in the figures have the following meaning:

"Blitz" ("Flash")_____. Flashlight photographs.
"B"_____ B-exposures.
"Man"_____ Daylight exposures without exposure regulator.
"Auto"_____ Daylight exposures with automatic exposures setting by means of exposure regulator.

In another manner, characteristic symbols may be used instead of or in addition to the above words or letters, for indicating the various settings. Thus, a symbol representing the sun may be associated with the expression "Man" in FIGS. 11 and 16.

By the provision of the above described setting means insurance is had that the operator will not be confused by the plurality of setting scales provided on the ring 22, but instead will always be able to select the proper scale and make an accurate setting, and will know without doubt which kind of exposure is associated with the setting value which appears in the viewing window 1c.

In order further to increase the operational reliability and simplicity of the camera there is provided by the invention a novel warning device which is made operative in response to movement or positioning of the manually operable setting ring 22, and which is conditioned for operation whenever the setting ring is in a position other than the "automatic position." The operator is thus reliably and unmistakably advised as to which of the two settings, namely the "automatic" and "non-automatic" settings, the ring 22 is in at any particular moment.

In the embodiment of FIG. 18 the warning device is constituted as an electric signal lamp which, for the purpose of saving the current source which energizes it, is arranged to be switched on only when the camera is ready for taking photographs.

The warning signal lamp comprises a small incandescent bulb which may be mounted in a holding ring on the camera, supplied with current by a battery. In order to switch on the lamp in response to movement on the setting ring 22, there is provided a switch 53 which is coupled with the above-mentioned switch 25 controlling the circuit of the exposure regulator. The switch 53 is connected in the lamp circuit in the usual manner, to effect a control over the lamp. The movable member of the switch 53 is fixedly mounted on an axially movable pin 26 which is arranged to engage the inner periphery of the setting ring 22 under the action of a coil spring 27. When the ring 22 is in a setting position other than the "automatic" position shown in FIG. 18 the switch 53 is closed and the incandescent lamp 51 is energized and illuminated. The lamp is preferably so arranged on the camera that the glow produced by it is visible in the view finder of the camera.

For the purpose of automatically energizing or switching on the lamp 51 when the camera is ready to take photographs there is provided an electrical switch 54 of the normally open type which is arranged in the lamp circuit. The movable portion of the switch 54 is fixedly mounted on a fingerpiece 55 of the shutter release mechanism, said fingerpiece being initially displaceable with respect to its carrier member 56 a slight extent against the action of a spring 57, during which the switch 54 is closed, continued movement of the fingerpiece 55 will now result in movement of the carrier member 56 whereby the camera shutter will be released, effecting an exposure.

This arrangement, which can be applied to cameras of any type, provides that the time during which the lamp is switched on, and thus the time during which current is being consumed from the battery, is short. On the other hand, the eye-catching glow of the lamp warns the operator in sufficient time to prevent operation of the camera release, to the effect that there is no automatic exposure setting being effected, and that instead the taking of the photograph must be preceded by a suitable setting process involving also the mental process required to adjust the setting members controlling the exposure factors.

FIG. 19 illustrates another warning device, which is constructed as a mechanical sign. A two-armed lever 59 is pivotally movable about an axis 58 provided on the camera case. One arm 59a of the lever 59 engages a pin 26 under the action of a spring 60 which biases the lever in a counterclockwise direction. The other arm 59b of the lever carries a visible flag 59c. The flag 59c is made visible in the finder 61 of the camera for setting positions of the ring 22 which differ from the automatic position and in which the lever 59 is pivoted into the position shown by the broken line in FIG. 19.

FIG. 13 further shows an arresting or detent device for the setting ring 22. This arresting device becomes operative when the setting ring 22 is in the "auto" setting position. The said arresting or detent device is designed, on the one hand, to give the operator a tactile feeling or clue upon reaching the automatic position, while it is adapted on the other hand to releasably secure the ring in this position, thereby preventing any unintentional shifting of the ring. The arresting device comprises a pivotal lever 62 cooperating under the action of a spring 63, with a triangular detent recess 22i developed on the inner periphery of the ring 22.

We claim:
1. In an automatic diaphragm setting camera, in combination, an exposure regulator having a driving device; a diaphragm setting mechanism; two movable setting members each having one-way positive, separable driving connections with said mechanism, said driving connections being separable when subjected to forces opposite to the intended driving forces, one of said members being manually operable, and movable over an adjusting, "non-automatic" range to adjust the diaphragm mechanism and further having a predetermined "automatic" position, said "automatic" position corresponding to one end position of the diaphragm setting mechanism and the driving connection of said one setting member comprising engageable parts which separate to effect a discontinuance of the control of the member over the diaphragm setting mechanism for the said "automatic" position of the member; transmission means for connecting the other of said setting members to the driving device of the said exposure regulator of the camera; and automatic means operative when the said one setting member is in the adjusting, "non-automatic" range to effect a shifting of the said other setting member to an inoperative position corresponding to one end position of the diaphragm setting mechanism prior to an exposure being made, the driving connection of said other setting member comprising engageable parts which separate to effect a discontinuance of the control of the member over the diaphragm setting mechanism for the said inoperative position of the member.

2. The invention as defined in claim 1, having means whereby the said driving device is actuated to shift the said other setting member toward the inoperative position thereof, when said one setting member is in its adjusting "non-automatic" range, and having means whereby the said exposure regulator is deenergized when the one setting member is in the adjusting, "non-automatic" range.

3. The invention as defined in claim 1, in which the setting members have paths of movement of different lengths in actuating the diaphragm setting mechanism over its entire range, the manually operable setting member having the path of greater length.

4. The invention as defined in claim 1, in which the separable parts of the one-way positive driving connections comprise juxtaposed cams on the setting members, and comprise a cam follower engageable with said cams and connected with the diaphragm setting mechanism, said mechanism biasing the cam follower into engagement with at least one of said cams.

5. The invention as defined in claim 4, in which there are visible marking means on the manually operable setting member to indicate the "automatic" position and "non-automatic" or adjusting range of the member, and in which the cams on the setting members are so arranged as to locate the "automatic" and "non-automatic" marking means on oppositely located areas of the manually operable member whereby when one marking means is visible to the operator the other is not, and vice versa.

6. The invention as defined in claim 1, in which there is an exposure-time setting device for adjusting shutter speeds in a range suited for taking photographs with the camera hand held and characterized by a monotonous exposure value gradation, and means connecting the said other setting member to the exposure setting device to effect automatic actuation of the latter.

7. The invention as defined in claim 6, in which there is a "B" exposure device for maintaining the shutter in open position to effect "B" exposures, in which there are means enabling said device to be operable when the one setting member is in the diaphragm adjusting range, and in which there is an additional control means associated with the one setting member for actuating the diaphragm setting mechanism over the entire diaphragm range with the "B" exposure device operative.

8. The invention as defined in claim 6, in which there is a control means for effecting a shutter speed suited for taking photographs with the camera hand held and photographs of objects moving at medium speed, said control means being operative when the manually operable setting member is in the said adjusting range, and in which there is an additional control means associated with the manually operable setting member for actuating the diaphragm setting mechanism over the entire diaphragm range with the first-mentioned control means operative.

9. The invention as defined in claim 1, in which the manually operable setting member has scales to indicate its settings, in which there is a stationary viewing window through which values of said scales may be viewed, and in which there are uncovered indicia on the said setting member, relating to the nature of the said scales.

10. The invention as defined in claim 1, in which there is a warning device adapted to be operable when the manually operable setting member is in its adjusting range.

11. The invention as defined in claim 10, in which the warning device comprises an electric signal lamp, and in which there are means for automatically closing a circuit connected with said lamp as a preliminary to effecting an exposure.

12. The invention as defined in claim 11, in which there is a camera release fingerpiece and a carrier for the same on which the fingerpiece is movably mounted, and in which the circuit closing means comprises a switch which is closed in response to movement of the fingerpiece on the carrier, said movement being a prerequisite to effecting a release of the camera.

13. The invention as defined in claim 10, in which the warning device comprises a movable mechanically actuated indicator adapted to appear in the view finder of the camera.

14. The invention as defined in claim 1, in which there is a detent means for releasably holding the manually operable setting member in the "automatic" position.

References Cited in the file of this patent

UNITED STATES PATENTS

| 2,061,909 | Karg | Nov. 24, 1936 |
| 2,841,064 | Bagby et al. | July 1, 1958 |
| 2,993,425 | Rentschler | July 25, 1961 |